United States Patent [19]

Hayakawa et al.

[11] Patent Number: 4,858,048
[45] Date of Patent: Aug. 15, 1989

[54] COMPLEX MAGNETIC TRANSDUCER HEAD OF SINGLE MAGNETIC POLE TYPE FOR PERPENDICULAR MODE RECORDING

[75] Inventors: Kiyonori Hayakawa, Ebina; Akio Mishima, Ayase, both of Japan

[73] Assignee: Sony Corporation, Tokyo, Japan

[21] Appl. No.: 85,322

[22] Filed: Aug. 10, 1987

Related U.S. Application Data

[63] Continuation of Ser. No. 677,550, Nov. 21, 1984, abandoned.

[30] Foreign Application Priority Data

Mar. 22, 1983 [JP] Japan .................................. 58-47666
Mar. 28, 1983 [JP] Japan .................................. 58-52157

[51] Int. Cl.$^4$ ............................................ G11B 5/265
[52] U.S. Cl. ..................................... 360/121; 360/118
[58] Field of Search ........................... 360/118–121, 360/122, 123, 110

[56] References Cited

U.S. PATENT DOCUMENTS 4,058,846  11/1977  Krutson et al. .................... 360/118
4,541,026   9/1985  Bonin et al. ....................... 360/126

FOREIGN PATENT DOCUMENTS 2095888  10/1982  United Kingdom ................ 360/110

Primary Examiner—Stuart N. Hecker
Assistant Examiner—David J. Severin
Attorney, Agent, or Firm—Hill, Van Santen, Steadman & Simpson

[57] ABSTRACT

A complex magnetic transducer head with a single magnetic pole includes a recording and reproducing main magnetic pole made of a thin film of soft magnetic material with a predetermined width and in contact with a magnetic recording medium. A non-magnetic guard member is adjacent each side of the recording and reproducing main magnetic pole and a magnetic core portion is integrated with each guard member. Grooves are formed in the magnetic core portion for separating a first auxiliary magnetic pole portion in contact with the recording and reproducing main magnetic pole from a magnetic flux return path portion. The winding is wound around the recording reproducing main magnetic pole through the grooves. An erasing head portion having a pair of erasing main magnetic poles faces the magnetic record medium and is spaced from the recording and reproducing main magnetic pole by a predetermined distance along the running direction of the magnetic record medium, and the pair of erasing main magnetic poles are spaced apart in a direction transverse to the running direction by a distance smaller than the width of the recording and reproducing main magnetic pole. A erasing winding is provided for exciting the erasing main magnetic poles. Previously recorded data on the magnetic record medium is erased, despite small displacements which may occur between the previously recorded track on the magnetic record medium and the recording and reproducing main magnetic pole.

5 Claims, 7 Drawing Sheets

COMPLEX MAGNETIC TRANSDUCER HEAD OF SINGLE MAGNETIC POLE TYPE FOR PERPENDICULAR MODE RECORDING

This is a continuation of application Ser. No. 677,550, filed Nov. 21, 1984 now abandoned.

DESCRIPTION

TECHNICAL FIELD

The present invention relates to a complex magnetic transducer head of a single magnetic pole type for perpendicular mode recording suitable for use as a recording and reproducing head of a flexible disc apparatus in which, for example, a flexible disc is used as a magnetic recording medium.

Reference is made to the following copending U.S. applications, namely, Ser. Nos. 766,675 now U.S. Pat. No. 4,707,417 and 755,779.

BACKGROUND ART

In general, a flexible disc apparatus is proposed, which uses a flexible magnetic disc as a magnetic recording medium. The flexible disc apparatus uses one magnetic transducer head to carry out both the recording and playback. Such flexible disc apparatus has a disadvantage of mis-tracking caused by a little displacement of a magnetic recording medium upon installing (chucking), contraction and expansion of the magnetic recording medium due to the change of temperature and humidity of the environment. Particularly when the re-recording is carried out, the previously recorded data can not be fully erased due to the mis-tracking and so on. There is then a disadvantage that upon reproducing, accurate data can not be obtained.

As a recording and reproducing magnetic transducer head for such flexible disc apparatus, a magnetic transducer head for perpendicular recording mode previously proposed by the present applicant in the published document of the Japanese patent application unexamined No. 153216/1983 can be used, which is capable of carrying out the high density magnetic recording (short wavelength recording) and which can easily be produced as shown in FIG. 1. A magnetic transducer head H for perpendicular mode recording disclosed therein is formed such that a main magnetic pole 1 made of a thin film of soft magnetic material having a predetermined width to oppose at its one end a magnetic recording medium is sandwiched by guard blocks 2, 2' and integrated therewith. The guard blocks 2, 2' are respectively formed of non-magnetic guard members 3, 3' extended from the contact surface with the magnetic recording medium to a predetermined position and magnetic core members 4, 4' bonded to the lower surfaces thereof and extended to the rear sides thereof. In the magnetic core members 4, 4', there are formed auxiliary pole members 6, 6' bonded to the main magnetic pole 1 and wound therearound a coil 5 and grooves 8, 8' for magnetically separating the auxiliary pole members 6, 6' with return path portions 7, 7', each of which becomes a return path of a magnetic flux of the main magnetic pole 1. Within the grooves 8, 8', the coil 5 is wound around the main magnetic pole 1 through the auxiliary magnetic pole members 6, 6'. According to such magnetic transducer head for perpendicular mode recording it is possible to carry out the high density magnetic recording.

However, even when the magnetic transducer head for perpendicular mode recording as shown in FIG. 1 is used, the mis-tracking is caused by the displacement of the magnetic recording medium upon mounting the medium on the apparatus and the contraction and expansion of the magnetic recording medium due to the change of temperature and humidity so that upon re-writing, the previously recorded data can not be erased completely and so on. As a result, upon reproducing, the accurate data frequently could not be obtained In view of the above aspect, the present invention is to provide a magnetic transducer head for perpendicular mode recording in which even when the displacement of track is caused by the displacement of the magnetic recording medium upon mounting and the contraction and expansion of the magnetic recording medium due to the change of temperature and humidity, upon rewriting, it is possible to prevent the previously recorded data from not being erased completely, and thus obtain accurate data upon reproducing.

DISCLOSURE OF INVENTION

According to the present invention, a complex magnetic transducer head of single magnetic pole type for perpendicular mode recording comprises a perpendicular mode magnetic recording and reproducing head portion which includes a recording and reproducing main magnetic pole having a predetermined width made of a thin film of soft magnetic material and confronting at its one end a magnetic recording medium, a non-magnetic guard member for sandwiching the recording and reproducing main magnetic pole at both its sides in contact with a surface of the magnetic recording medium, a magnetic core portion integrated with the non-magnetic material guard member, contacting with at least one surface of the recording and reproducing main magnetic pole and disposed at the position remote backward from the magnetic recording medium by a predetermined distance and grooves formed in the magnetic core portion for separating a first auxiliary magnetic pole portion contacting with the recording and reproducing main magnetic pole and a return path portion which becomes a return path of magnetic flux from the recording and reproducing main magnetic pole, this perpendicular mode magnetic recording and reproducing head portion having a coil wound around the recording and reproducing main magnetic pole through the grooves and an erasing head portion which consists of a pair of erasing main magnetic poles disposed at the position remote from the recording and reproducing main magnetic pole by a predetermined distance in the running direction of this magnetic recording medium, the pair of the erasing main magnetic poles having a spacing along a width direction of the recording and reproducing main pole smaller than the width of this recording and reproducing main magnetic pole and a coil for exciting the erasing main magnetic poles, in which the recording and reproducing main magnetic pole and the erasing main magnetic poles are integrated on the magnetic record medium contact surface through a non-magnetic guard member. Accordingly, even if the mis-tracking is caused by a small displacement of the magnetic record medium when it is mounted relative to the magnetic transducer head and contraction and expansion of the magnetic record medium due to the change of temperature and humidity, upon re-writing, it is avoided that previous data is left unerased. Thus, upon playback, it is possible to obtain accurate data.

BEST MODE FOR CARRYING OUT THE INVENTION

An embodiment of a complex magnetic transducer head of single magnetic pole type for perpendicular mode recording according to the present invention will hereinafter be described with reference to FIGS. 2 and 3.

Figure 2:
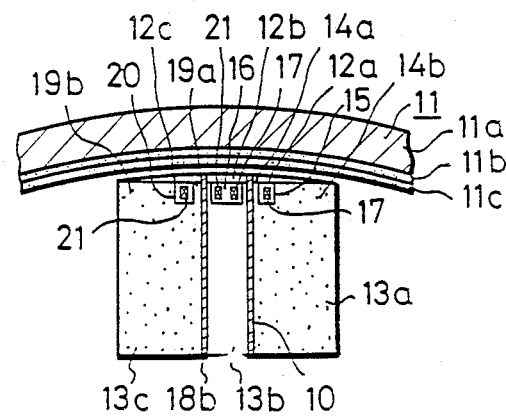
FIG. 2 is a cross-sectional view illustrating an embodiment of a complex magnetic transducer head of single magnetic pole type for perpendicular mode recording according to the present invention.
Figure 3:
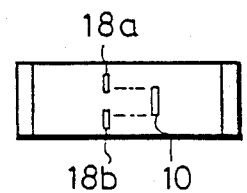
FIG. 3 is a top view of FIG. 2.

In FIGS. 2 and 3, reference numeral 10 designates a main magnetic pole for recording and reproducing made of a thin film of soft magnetic material and in which its one end in contact with a magnetic recording medium 11 is made to have a predetermined width. In a surface opposing the magnetic recording medium 11, the main magnetic pole 10 for recording and reproducing is integrally sandwiched at its both sides by non-magnetic guard members 12a and 12b having a predetermined thickness, and a magnetic core 13a and a non-magnetic member 13b are bonded to the lower surfaces of the non-magnetic guard members 12a and 12b so as to integrally sandwich the main magnetic pole 10 for recording and reproducing at its both sides. In this case, the magnetic core 13a formed behind the non-magnetic guard member 12a constructs a return path of a magnetic flux generated from the main magnetic pole for recording and reproducing 10. On the side of the magnetic core 13a contacting with the non-magnetic member 12a and in the vicinity of the main magnetic pole 10 for recoding and reproducing, there is formed a groove 15 which separates an auxiliary magnetic pole member 14a disposed near the main magnetic pole 10 for recording and reproducing from a return path member 14b which becomes a return path of the magnetic flux generated from the main magnetic pole 10 for recording and reproducing. Further, a predetermined groove 16 is formed on the non-magnetic member 13b at its side contacting with the non-magnetic guard member 12b. Through these grooves 15 and 16, a recording and reproducing winding 17 is wound on the main magnetic pole 10 for recording and reproducing. The magnetic recording medium 11 used here is formed such that on a substrate 11a made of, for example, synthetic resin is formed a high magnetic permeability material layer 11b on which a perpendicular magnetic recording layer 11c is further formed.

In order to avoid a crosstalk between the recording-/reproducing side and the erasing side, it is better that the area in which the magnetic cores 13a and 13c are opposed to each other is made small with their magnetic paths being secured. In this case, the magnetic cores 13a, 13c may be formed of non-magnetic material at their sides remote from the magnetic recording medium.

Reference numerals 18a and 18b respectively designate main magnetic poles for tunnel erase made of a thin film of soft magnetic material and which are disposed at the down stream from the main magnetic pole 10 for recording and reproducing. The main magnetic poles 18a and 18b for erasing, working for so-called tunnel erase are disposed to have a spacing smaller than the width of the main magnetic pole 10 for recording and reproducing. In this case, the main magnetic poles 18a and 18b for tunnel erase are respectively formed on a surface opposite to the surface with the spacing along a width direction of the recording and reproducing main magnetic pole smaller than the width of the main magnetic pole 10 for recording and playback in which the main magnetic pole 10 for recording and playback is bonded to the non-magnetic guard member 12b and the non-magnetic member 13b. Then, the main magnetic poles 18a, 18b for erasing are sandwiched at their both sides by the non-magnetic guard member 12b, the non-magnetic member 13b and the non-magnetic guard member 12c, the magnetic core 13c bonded to its rear surface. The magnetic core 13c constructs the return path of the magnetic fluxes generated from the main magnetic poles 18a, 18b for tunnel erase. In the magnetic core 13c at its side in contact with the non-magnetic guard member 12c and near the main magnetic poles 18a, 18b for tunnel erase, there is formed a groove 20 which separates an auxiliary magnetic pole member 19a formed near the main magnetic poles 18a, 18b for tunnel erase from a return path member 19a of the magnetic flux generated from the main magnetic poles 18a, 18b for tunnel erase. Through this groove 20 and the groove 16 of the non-magnetic member 13b, a coil 21 for erasing is wound around the main magnetic poles 18a, 18b for tunnel erase.

Figure 4A:
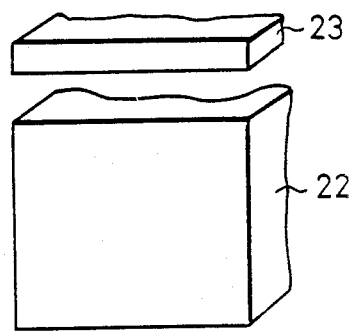
FIGS. 4a–4g comprise a diagram showing a manufacturing method for producing the complex magnetic transducer head of single magnetic pole type for perpendicular mode recording according to the present invention.
Figure 4B:
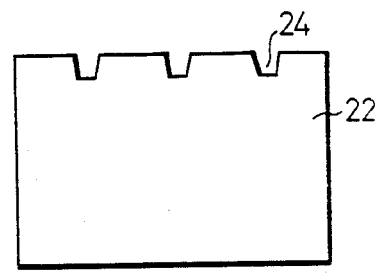
Figure 4C:
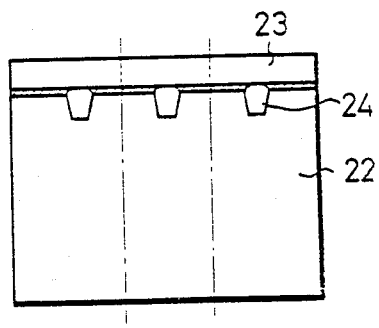

A manufacturing method for producing the complex magnetic transducer head of single magnetic pole type for perpendicular mode recording will hereinafter be described with reference to FIG. 4 and the followings. Firstly, as shown in FIG. 4A, two non-magnetic block members 22 and 23 are prepared. It is desired that the non-magnetic block members 22 and 23 are made of material which is desired to be dense, with a thermal expansion coefficient similar to ferrite and hard (for example, non-magnetic ferrite such as Zn-ferrite and the like, forsterite, photo ceram, crystallized glass, barium titanate, calcium titanate, $Al_2O_3$-TiC series or $ZrO_2$-series ceramic and so on). Then, on one non-magnetic block member 22 are formed grooves 24 which will become the winding apertures 16 with a spacing of a predetermined dimension (FIG. 4B). The surface on which the grooves are formed is mirror-polished, while the other non-magnetic block member 23 is mirror-polished. The two non-magnetic block members are bonded together by melt bonding by glass, organic adhesive agent such as epoxy resin and so on, inorganic adhesive agent such as water glass and so on (FIG. 4C). The non-magnetic block members are cut out at the intermediate portion of the grooves 24 and in parallel to the groove 24 and the cut-out surface is mirror-polished. At this time, since the thicknesses (W1 and W2) of the cores at the winding aperture 16 give the diameter of the windings, they are important. In order to improve recording and reproducing sensitivity, it is desired that the diameter of the winding is made as small as possible, thus the thickness of the core being preferably made as thin as possible. Therefore, as far as the mechanical strength permits or as far as the work technique permits, it is desired that the thickness of the core is made as thin as possible. It is desirable that such thickness is selected to be less than, for example, 100 $\mu$m or 50 $\mu$m, if possible. It is desired to reduce the thickness of particularly the recording and reproducing winding side which affects the sensitivity severely. Since the tunnel erase side is not required to have so high sensitivity as the recording and reproducing side is, in order to keep the strength as a whole, it may be considered that the thickness of the recording and reproducing side is reduced, while that of the tunnel erase side is increased more than the thickness of the recording and reproducing side. Further, the mirror-polished surface and the side surface (the front surface side in FIG. 4D) are formed to have a right angle with high precision and a broken-off of the edge portion is reduced so as to form a correct edge portion. If the front surface as, for example, shown in FIG. 4B is mirror-polished in advance and then the grooves are formed at a right angle with high accuracy, such condition can be realized relatively easily.

Figure 4D:
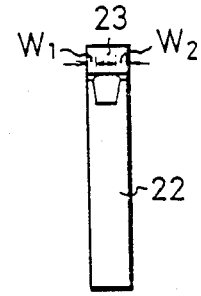
Figure 4E:
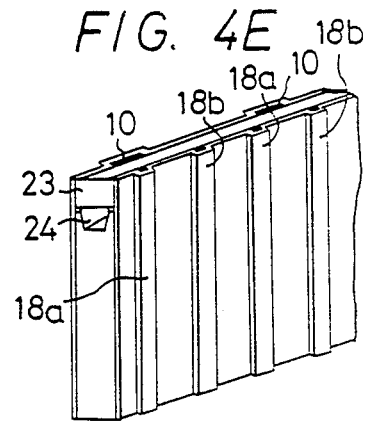
Figure 5:
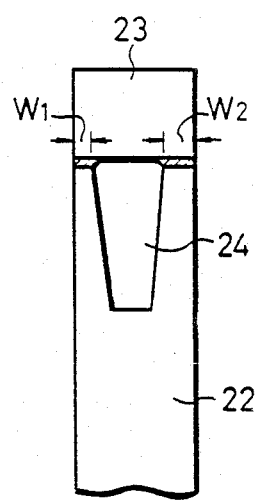
FIGS. 5, 6, 7, 8 and 9 are respectively diagrams useful for explaining FIG. 4.
Figure 6:
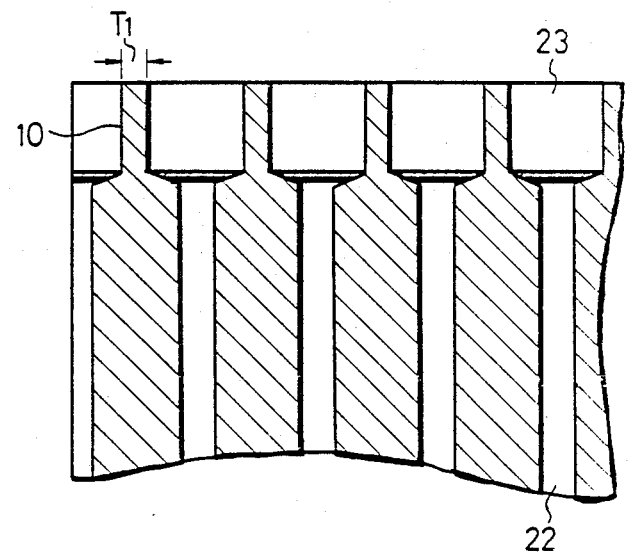
Figure 7:
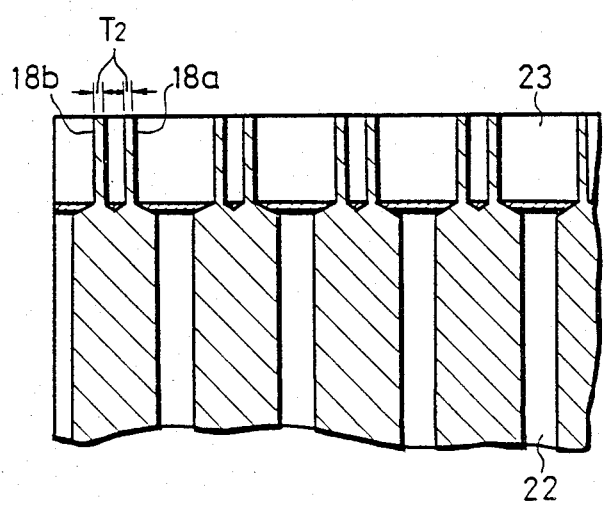

Then, as shown in FIG. 4E, the recording and reproducing main magnetic pole 10 and the main magnetic poles 18a, 18b for tunnel erase are formed on the mirror polished surface. In the manufacturing method of the above main magnetic poles, first, a layer made of $SiO_2$, $Si_3N_4$, $Al_2O_3$, $ZrO_2$ and the like is deposited on both mirror-polished surfaces by sputtering, vacuum evaporation, ion plating and so on to have a thickness of about 0.1 to 1.0 $\mu$m. It is desired that the layer is formed as dense as possible. It is possible to omit the above layer but this layer can improve the magnetic characteristic of a magnetic thin film which is deposited on the above layer. Then, on one surface (when W1 and W2 in FIG. 4D and FIG. 5 are not equal to each other, the surface at the side of the smaller thickness, namely, the surface on the W1 side) is deposited a magnetic thin magnetic film having a high magnetic permeability such as permalloy, sendust alloy, an amorphous magnetic film, for example, Co-Zr, Co-Zr-Nb and so on, so as to have a thickness of about 0.05 $\mu$m to 3 $\mu$m by sputtering, vacuum evaporation, ion plating, plating and so on. This thickness is determined in consideration of resolution, recording and reproducing sensitivity and so on, and the thickness ranging from about 0.1 $\mu$m to 0.5 $\mu$m is practical. Then, this magnetic film is subjected to etching process (wet or dry system) using a photolithography technique so as to make a stripe pattern of a predetermined track width and a spacing. At this time, in order to make the positioning of the main magnetic poles 18a, 18b for tunnel erase which will be deposited later, the stripe is formed at a predetermined position from the reference end portion. Alternatively, the shape of the magnetic film is not limited to the stripe shape but the portion lower than the bonded portion may be formed wider as shown in FIG. 6, thus a high sensitivity being achieved. Further, on the above magnetic film is deposited a hard film made of $SiO_2$, $Si_3N_4$ $Al_2O_3$, $ZrO_2$ or the like so as to have a thickness of about 0.1 $\mu$m to 3 $\mu$m by sputtering, vacuum evaporation, ion plating or the like as a protection film. Then, on the opposite surface is deposited a magnetic thin film permalloy, sendust alloy. (amorphous magnetic film such as Co-Zr, Co-Zr-Nb and so on) which will become the main magnetic pole for tunnel erase so as to have a thickness of about 0.1 to 5 $\mu$m by sputtering, vacuum evaporation, ion plating, plating and the like. This thickness is selected so as to achieve excellent erasing sensitivity and in most case, the proper thickness ranges from about 0.5 to 1 $\mu$m. Then, the magnetic thin film is etched by using a photolithography technique to be a stripe-shaped magnetic film with a predetermined width and making a pair in correspondence with the respective recording and reproducing magnetic films. Further, on the above magnetic film is deposited a hard film such as $SiO_2$, $Si_3N_4$, $Al_2O_3$, $ZrO_2$ and so on to have a thickness of about 0.1 $\mu$m to 3 $\mu$m by sputtering, vacuum evaporation, ion plating or the like as a protection film. The shape of the magnetic film for tunnel erase may be formed as shown in FIG. 7.

Figure 8:
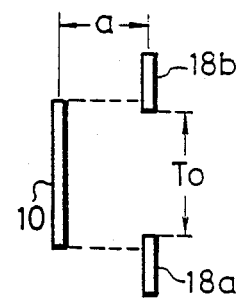

FIG. 8 shows a mutual positional relation between the recording and reproducing main magnetic pole 10 and the main magnetic poles 18a, 18b for tunnel erase. The width T1 of the recording and reproducing main magnetic pole 10 is made wider than the spacing between the main magnetic poles 18a and 18b for tunnel erase. After the recording by the recording and reproducing main magnetic pole 10, the track end is erased by the main magnetic poles 18a, 18b for tunnel erase. Thus, since the track width finally recorded becomes equal to the spacing To between the main magnetic poles 18a, 18b for tunnel erase the positioning between the recording and reproducing main magnetic pole 10 and the main magnetic poles 18a, 18b for tunnel erase must be carried out with high precision. Firstly, the recording and reproducing main magnetic pole 10 is positioned from the end portion of the substrate with high precision and then, the main magnetic poles 18a, 18b for tunnel erase are positioned on the basis of the reference end. To this end, as mentioned before, the reference side surface has to have a right angle and the edge thereof must be sharp. As another positioning method, it may be considered that a transparent substrate (it is sufficient that any one of the non-magnetic block member 22 or 23 is transparent) is used, and when the second patterning of the magnetic pole is carried out, the position of the pattern is optically confirmed from the back side so as to carry out the positioning.

Figure 4F:
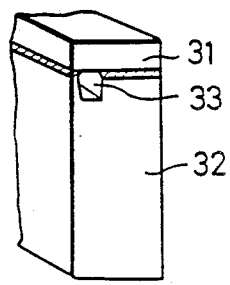
Figure 4G:
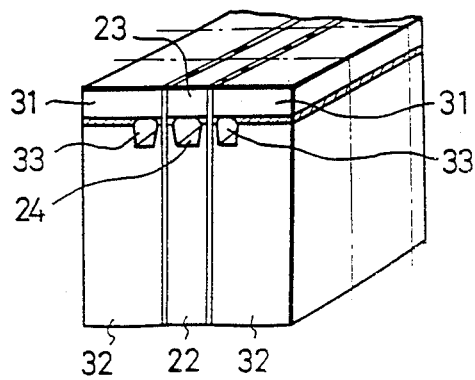
Figure 9:
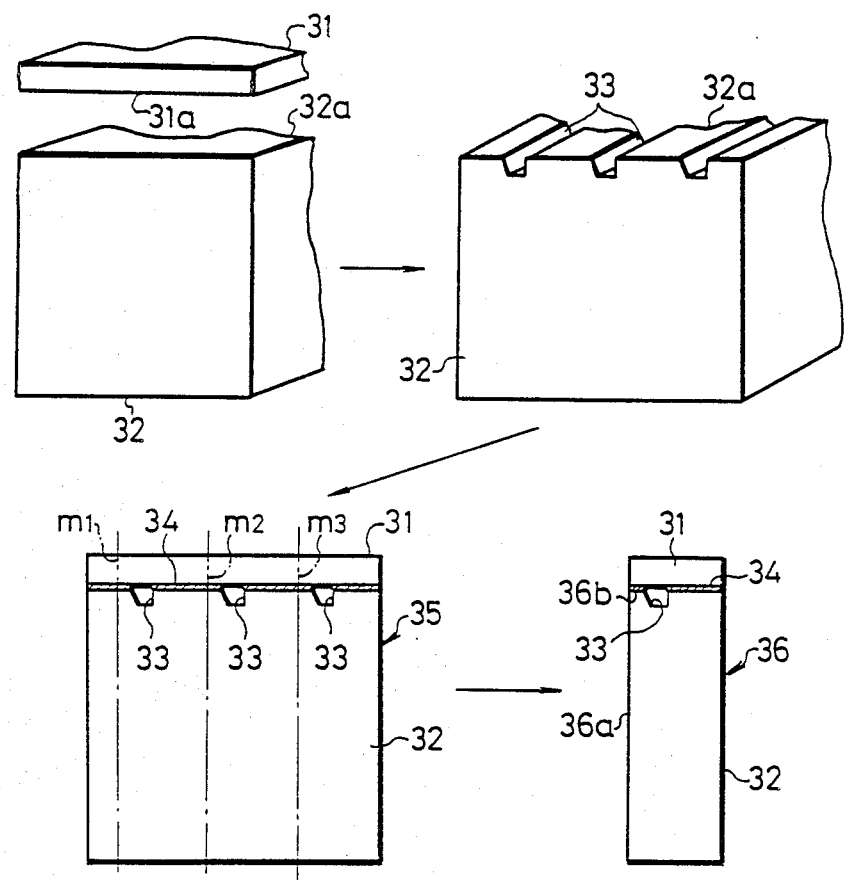

Next, the complex block as shown in FIG. 4F is prepared. This complex block is formed as shown in FIG. 9. In FIG. 9, a non-magnetic plate shape block 31 and a magnetic material block 32 are prepared. While as the non-magnetic plate block 31 a material similar to the non-magnetic block 23 as shown in FIG. 4 is used, the material for the non-magnetic plate block is not limited particularly if the non-magnetic material is hard, dense and has an thermal expansion coefficient substantially same as that of ferrite. Further, the magnetic material block 32 can be constructed by Mn-Zn series ferrite, Ni-Zn-series ferrite and the like. Each one surface of the non-magnetic plate shape block 31 and the magnetic material block 32 is mirror-polished. Then, grooves 33 are formed on the mirror-polished surface 32a of the magnetic material block 32 with a predetermined spacing. Under this condition, the mirror-polished surface 31a of the non-magnetic plate block 31 is opposed to and then bonded to the mirror-polished surface 32a of the magnetic material block 32. Although this bonding can be carried out by melt bonding by glass, organic bonding agent such as an epoxy adhesives or the like, or inorganic bonding agent 34 such as a water glass and so on the melt bonding by glass is desired. Since the melt bonding by glass is sometimes carried out again in the later process, glass having so high melting temperature as not to be melted by the second melt bonding is employed. A bonded member 35 formed of the non-magnetic plate shape block 31 and the magnetic material block 32 is cut out along the surfaces shown by one-dot chin lines m1, m2, m3 . . . across the non-magnetic plate shape block 31 and the magnetic material block 32 to have a predetermined thickness, thus one complex block 36 being produced. Then, one surface 36a of this complex block 36 is mirror-polished. At that time, in order to achieve high sensitivity, it is desirable that similarly to the case of FIG. 4D, the thickness of the portion which will become an auxiliary core 36b is made as thin as possible so far as mechanical strength upon manufacturing is permitted. This complex block is bonded to the both mirror-polished surfaces shown in FIG. 4E by melt bonding by glass, organic adhesive agent such as epoxy resin and so on, inorganic adhesive agent such as water glass and the like (FIG. 4G). Thereafter, the complex block is cut into each magnetic transducer head and the contact surface thereof is polished and a winding is wound thereof, thus the magnetic transducer head as shown in FIG. 2 being produced.

While in the above description the patterning of the magnetic pole is carried out on both sides of the central block, it is possible that the recording and reproducing main magnetic pole 10 and the main magnetic poles 18a, 18b for tunnel erase may be respectively patterned on the sides of the complex blocks bonded to the both sides, and then they are bonded to the central block which was formed in FIG. 4D. In this case, it is difficult to match the recording and reproducing main magnetic pole 10 and the main magnetic poles 18a, 18b for tunnel erase to one another in position.

Figure 1:
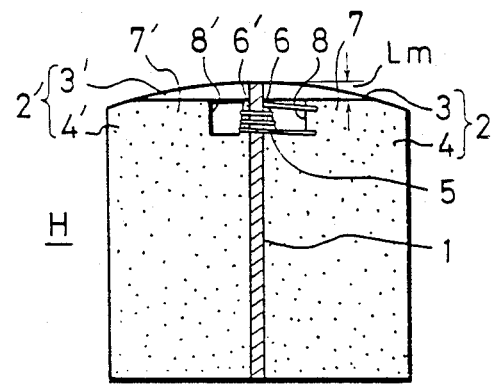
FIG. 1 is a cross-sectional view illustrating an example of a magnetic transducer head for perpendicular mode recording.
Figure 10:
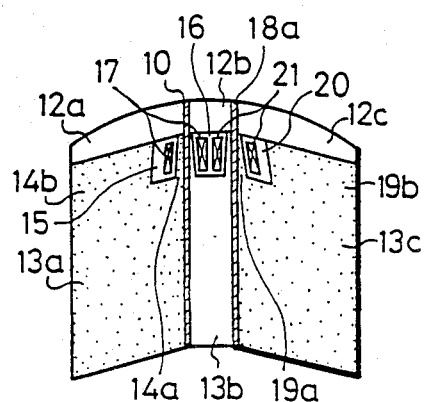
FIGS. 10, 12, 15, 16, 25 and 26 are respectively cross-sectional views illustrating the other embodiments of the present invention.
Figure 11:
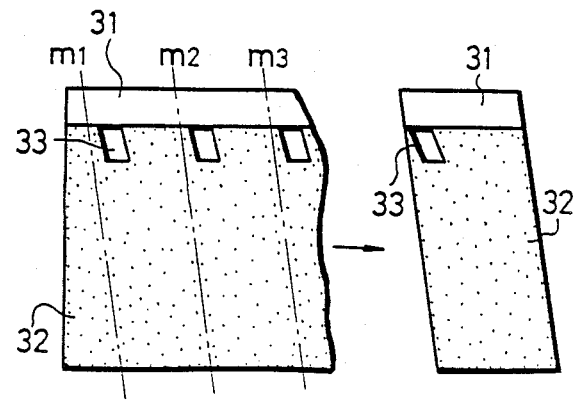
FIG. 11 is a diagram useful for explaining FIG. 10.

Since the length Lm of the magnetic pole (the length of the main magnetic pole portion protruded from the auxiliary magnetic pole portion 6 as shown in FIG. 1) exerts a great influence upon recording and reproducing sensitivity, it is necessary to reduce the length Lm in order to achieve high sensitivity. However, in the magnetic transducer head with the structure as shown in FIG. 2, if the length Lm is reduced, the portion of the winding aperture becomes thin and may be pierced with a hole at last. Therefore, it is considered desirable to incline the bonded portion of the complex substrate, and FIG. 10 is a cross-sectional view illustrating such magnetic transducer head. As shown in FIG. 10, the central block with the thin film of magnetic material is the same as that in FIG. 4 and the blocks at both sides are formed as shown in FIG. 11. Other manufacturing procedures are the same as those of FIG. 4. Thus, even if the length Lm is reduced, it is possible to keep the strength of the guard block material of the winding aperture portion.

Figure 12:
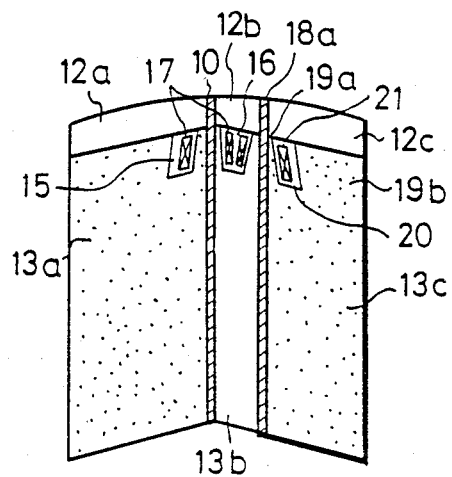
Figure 13:
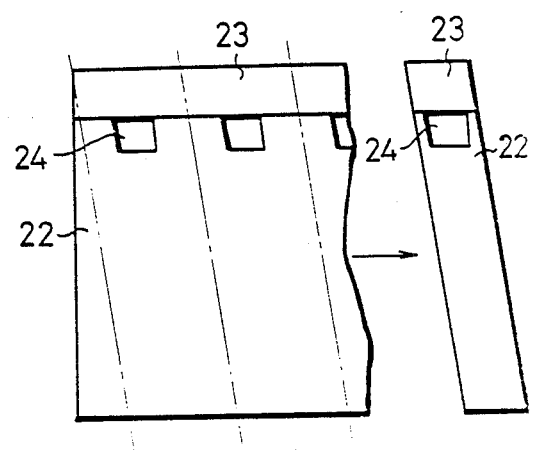
FIG. 13 is a diagram useful for explaining FIG. 12.

Generally, in order to raise the playback resolution, the main magnetic pole 10 for recording and reproducing must reduce the thickness of the magnetic pole and the spacing between the magnetic transducer head and the magnetic tape must be made as small as possible. On the other hand, since it is sufficient that the magnetic pole for tunnel erase can carry out the DC erase, the thickness of its magnetic pole can be increased and the problem of the spacing is not so important as the main magnetic pole 10 for recording and reproducing. Therefore, such a magnetic transducer head is considered that a main magnetic pole for recording and reproducing is disposed in the central portion which provides a satisfactory contact with the magnetic tape (FIG. 12). The center block is formed such that the winding aperture and the cut-out are inclined as shown in FIG. 13. The blocks at both sides of the center block can be formed in accordance with FIG. 11.

So far as the recording and reproducing sensitivity is the same, it is preferable that the impedance of the coil is as small as possible. The impedance of the coil greatly depends on the cross section area of the ferrite core within the coil. In the previously proposed magnetic transducer head, the width (in the track width direction) of the ferrite core within the coil is equal to the thickness of the magnetic transducer head. The portion of the auxiliary core which is required in practice is the portion opposing to the main magnetic pole film. Thus, when the portion except the portion opposing to the main magnetic pole film is filled with glass and the like, it is possible to lower the impedance of the coil.

Figure 14:
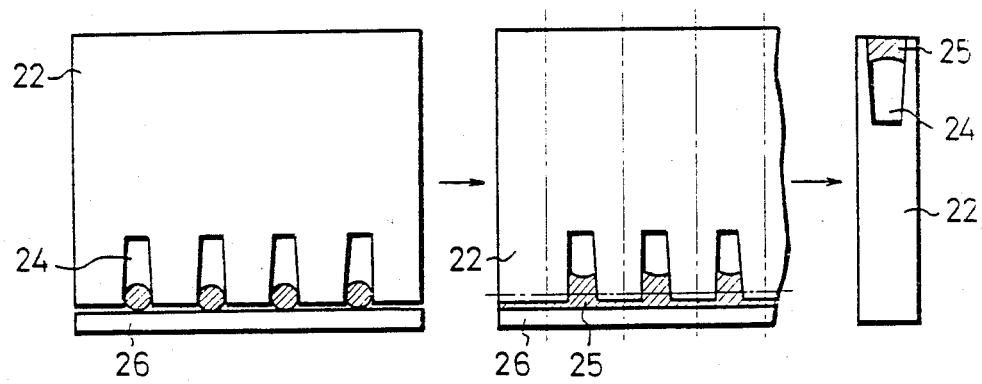
FIG. 14 is a diagram useful for explaining the other embodiment of the present invention.
Figure 15:
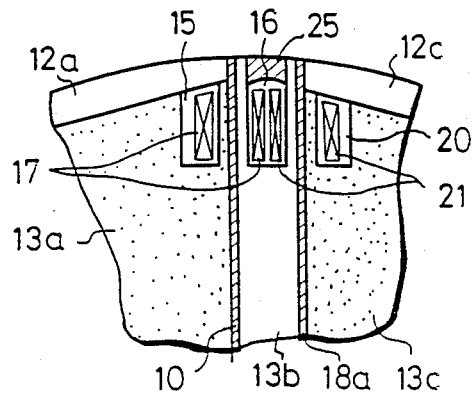

The center block can be formed by the following method other than the method shown in FIG. 4. As shown in FIG. 14, a winding groove 24 is formed on the non-magnetic material block 22 and the upper portion thereof is filled with glass 25 (after the groove 24 is covered with a non-magnetic material plate 26 of the same quality, a glass rod 25a is inserted thereinto and melt by heat so as to form a bridge by glass). Then, the center bock is cut into respective blocks and the side surface of each block is mirror-polished and thus the central block being formed. The characteristic of this block lies in that the surfaces to be mirror-polished are made of the same material and the bonded portion thereof is never exposed to the mirror-polished surface unlike the center block as shown in FIG. 4. When the surface is mirror-polished, since the bonded portions are different in hardness, there is a step which is easily caused. Thus, when the surface is mirror-polished so as to avoid the step, the high mirror-polishing technique is required and thus the yield thereof grows worse. The above manufacturing method can remove such defects. FIG. 15 is a cross-sectional view illustrating a magnetic transducer head which is provided by this central block. Since the glass 25 is exposed on the contact surface, this magnetic transducer head has a defect that this glass portion is concaved little and is apt to be scratched. Consequently, the contact surface must be mirror-polished with great care.

When the complex magnetic transducer head of single magnetic pole type for perpendicular mode recording according to this embodiment is used as the record and reproduce magnetic head of, for example, the flexible disc apparatus to carry out the recording on the magnetic recording medium 11, a record signal is supplied to the coil 17 of the main magnetic pole 10 and the magnetic recording is carried out by the main magnetic pole 10, while an erase current (DC) is supplied to the erasing coil 21 of the main magnetic poles 18a, 18b for tunnel erase to thereby erase the both sides of the record track. Thus, even when the track is displaced a little by some displacement of the magnetic recording medium upon its mounting and slackened thereof due to the change of temperature and humidity and so on, the previously recorded data is never left unerased upon rewriting so that upon playback, accurate data can be obtained.

In the manufacturing process for producing the above complex magnetic transducer head of single magnetic pole type for perpendicular mode recording, the portions which need the mirror-polishing are formed on the common plane at all times (for example, there is required no process for mirror-polishing of two parallel surfaces which have a step therebetween) so that the manufacturing process becomes easier. Further, since the bonded surface is always formed on the common plane, the bonded film can be made extremely thin and the bonding thereof is very easy. Furthermore, since the main magnetic pole made of magnetic thin film is formed by sputtering, vacuum evaporation, ion plating, plating and the like, its thickness can be controlled easily. In addition, since the width thereof is determined by the etching using photolithography technique, the track width of the track can be made narrow with ease and can be manufactured with high precision. And, the recording and reproducing main magnetic pole 10 and the tunnel erase main magnetic poles 18a, 18b can be matched in position with ease.

Further, the following magnetic transducer head is considered in which the spacing a between the recording and reproducing main magnetic pole 10 and the tunnel erase main magnetic poles 18a, 18b is made smaller to enhance the recording and reproducing characteristics. This magnetic transducer head will hereinafter be described with reference to FIGS. 16 to 27. In FIGS. 16 to 27, like parts corresponding to those in FIGS. 1 to 15 are marked with the same references and will not be described in detail.

Figure 16:
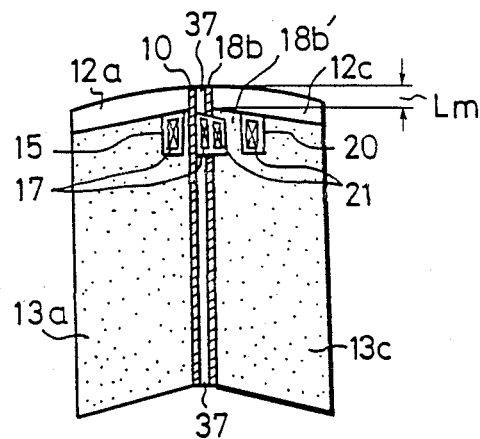

In FIG. 16, reference numeral 37 designates a non-magnetic material member, and the width of the non-magnetic material member 37 in the running direction of the magnetic recording medium is made narrow as compared with the aforementioned example. Accordingly, as shown in FIG. 8, the spacing a between the recording and reproducing main magnetic pole 10 and the tunnel erase main magnetic poles 18a, 18b which are disposed at the both sides of the non-magnetic material member 37 become narrow.

Reference numeral 18b' designates an auxiliary magnetic pole member which is magnetically connected to the tunnel erase main magnetic poles 18a, 18b at the position remote backwards from the surface on which the magnetic recording medium is transported so as to form a magnetic path curved to the downstream side of the magnetic recording medium. With this structure, even if the spacing between the recording and reproducing main magnetic pole 10 and the tunnel erase main magnetic poles 18a, 18b is made narrow, it is possible to secure the winding spacing for the tunnel erase coil 21.

Other portions are formed similarly to FIG. 10.

Subsequently, the manufacturing process of this embodiment will be described. Similarly to the manufacturing process of the embodiment shown in FIG. 10, the complex block as shown in FIG. 11 is produced. Thereafter, the left-hand side and right-hand side portions of the magnetic transducer head shown in FIG. 16 is produced via the following process.

Figure 17:
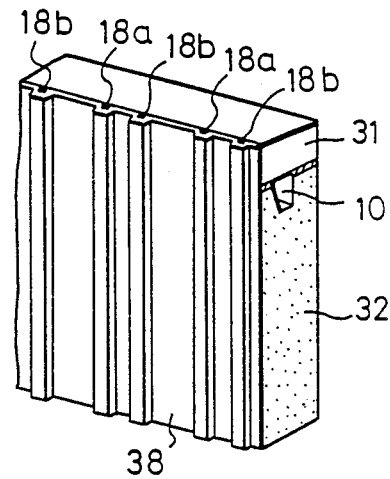
FIGS. 17, 18, 19, 20, 21, 22, 23 and 24 are respectively diagrams useful for explaining FIG. 16.
Figure 18:
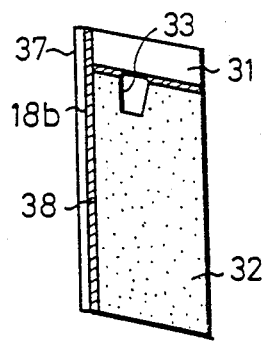
Figure 19:
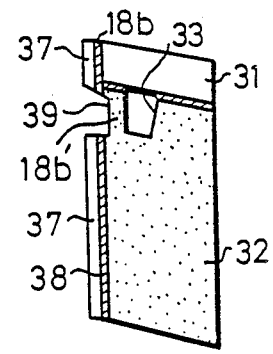

The manufacturing process for producing the right-hand side portion, namely, the portion on the side of the tunnel erase main magnetic poles 18a, 18b will be described. As shown in FIG. 17, a protection film made of $SiO_2$, $Si_3N_4$, $Al_2O_3$, $ZrO_2$ and the like is formed on the surface to which the tunnel erase main magnetic pole films are formed so as to have a thickness of about 0.1 $\mu$m to 1 $\mu$m by sputtering, vacuum evaporation, ion plating and the like. This protection film is to prevent the permeation of impurity from the substrate. Then, as the tunnel erase main magnetic pole film, permalloy, sendust alloy, an amorphous magnetic alloy such as Co-Zr, Co-Zr-Nb and so on or the like is deposited on the surface by sputtering, vacuum evaporation, ion plating, plating and the like and then subjected to etching treatment using photolithography technique to have a predetermined dimension or the thickness of about 0.1 $\mu$m to 5 $\mu$m to thereby form the main magnetic poles 18a, 18b. At this time, in order to facilitate the positioning upon the bonding with the recording and reproducing head, the masking is carried out in such a manner that the tunnel erase main magnetic poles 18a, 18b are positioned at the predetermined position from the high precision surface. As a protection film 38, a film made of $SiO_2$, $Si_3N_4$, $Al_2O_3$, $ZrO_2$ and the like is deposited thereon to have a thickness of about 0.5 $\mu$m to 3 $\mu$m by sputtering, vacuum evaporation, ion plating and so on. Then, the non-magnetic material member 37 is bonded thereon so as to isolate the recording and reproducing main magnetic pole 10 and the tunnel erase main magnetic poles 18a, 18b from one another as shown in FIG. 18. Preferably, this non-magnetic material member 37 is made of the same material as that of the non-magnetic material guard members 12a, 12c and has a thickness of about 50 $\mu$m to 200 $\mu$m. The reason for this is that if the thickness thereof is made thinner, the recording and reproducing main magnetic pole and the tunnel erase main magnetic poles become too close to one another, resulting in a problem of leakage magnetic flux, while the thickness is too large, the magnetic transducer head of this embodiment becomes the same as that shown in FIG. 10. It may be possible that the non-magnetic material member 37 having a thickness of 50 $\mu$m to 200 $\mu$m is bonded directly or the non-magnetic material member 37 of, for example, 500 $\mu$m thick is bonded and then abraded and polished so as to have a predetermined thickness. Then, there is formed a groove 39 for the tunnel erase coil 21 and the recording and reproducing coil 17 with a predetermined dimension as shown in FIG. 19. At this time, the magnetic material portion 18' which is formed by the previously formed groove 33 and the groove 39 forms a part of the tunnel erase main magnetic poles. Properly, the thickness thereof is about 200 $\mu$m to 300 $\mu$m. If the thickness is thinner, the core will be cracked upon forming the groove, while the thickness is too large, the diameter of the erase coil 21 becomes large so that the coil impedance is increased and the recording and reproducing efficiency grows worse.

Figure 20:
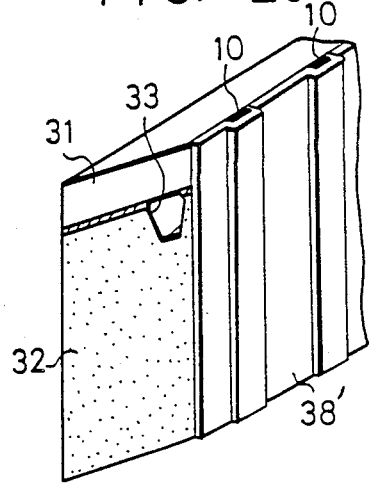
Figure 21:
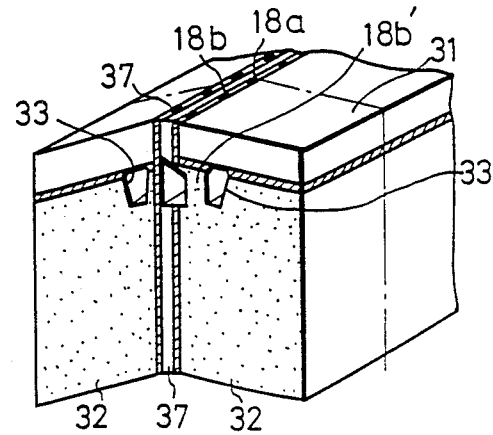

Next, an explanation will be given on a manufacturing method for producing the left-hand side portion, namely, the portion on the side of the recording and reproducing main magnetic pole. As shown in FIG. 20, after the surface of the complex block is mirror-polished, a high permeability magnetic material film such as permalloy, sendust alloy, amorphous magnetic alloy such as Co-Zr, Co-Zr-Nb and so on which becomes the recording and reproducing main magnetic pole 10 is deposited on the mirror-polished surface and then subjected to etching by using photolithography technique so as to have a predetermined dimension. The bonded surface of the magnetic core 13a and the non-magnetic material guard member 12a forms an acute angle relative to the main magnetic pole 10. In order to match the recording and reproducing main magnetic pole 10 and the tunnel erase main magnetic poles 18a, 18b with one another in position, the side surface of the magnetic material block 32 is mirror-polished and further the main magnetic pole surface and the side surface of the magnetic material block are adapted to form a right angle with high precision. Then, the position of the recording and reproducing main magnetic pole 10 is determined in advance in order that when the reference surfaces of the left and right complex blocks are contacted to each other, they are arranged at a predetermined position. With the reference surfaces made coincident with each other, the two blocks thus made are bonded together by melt bonding by glass, organic adhesive agent such as epoxy resin and the like, inorganic adhesive agent such as water glass and the like (FIG. 21). Then, the contact surface with the magnetic record medium is cylindrically polished to make the magnetic pole film have a predetermined length and the complex block is separately cut into respective magnetic block members. Thereafter, the magnetic block is bonded to a base substrate and subjected to the recording and reproducing wiring treatment and the tunnel erase winding treatment, thus the complex magnetic transducer head of single magnetic pole type for perpendicular mode recording being provided.

As described above, according to this embodiment, since the magnetic path, which is magnetically connected to the tunnel erase main magnetic poles 18a, 18b and curved from the tunnel erase main magnetic poles to the downstream of the magnetic recording medium, is formed to secure the winding spacing, it is possible to reduce the distance or spacing between the recording and reproducing main magnetic pole and the tunnel erase main magnetic poles without deteriorating excellent electromagnetic transducer characteristic.

As a result, it is possible to reduce the delay time from a timing when the magnetic record medium contacts with the recording and reproducing main magnetic pole 10 to a timing when the magnetic record medium contacts with the tunnel erase main magnetic poles 18a, 18b. Thus the record and playback can be carried out satisfactorily.

Figure 22:
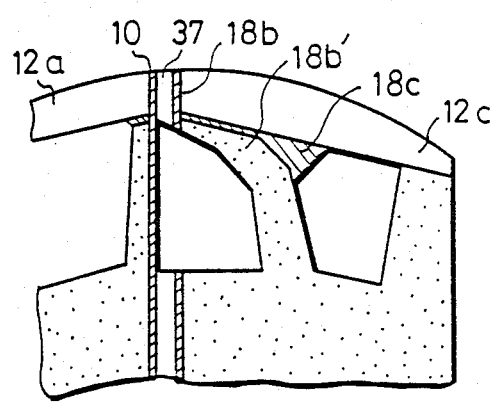
Figure 23:
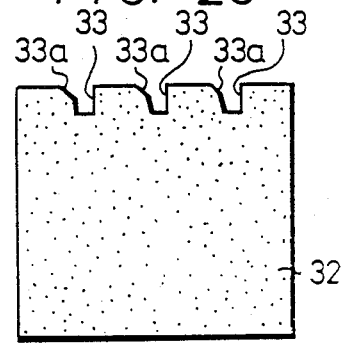
Figure 24:
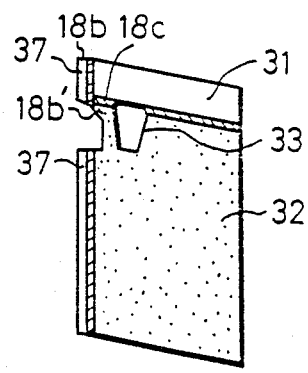

Preferably, the magnetic material portion 18b' in the above embodiment is formed as the smooth shape as shown in FIG. 22. At this time, the magnetic material portion is preferably reinforced by, for example, glass 18c. When the magnetic material portion is formed smooth as above, the leakage magnetic flux is decreased and it is possible to alleviate the decline of efficiency which is caused by the fact that the tip end portion of the erase main magnetic pole (portion contacting with the record medium) does not exist on the extension of the center of the coil 21. In order to form the magnetic material portion as such smooth shape, when the groove 33 is formed, an edge portion 33a of the groove is cut by the predetermined shape as shown in FIG. 23. As shown in FIG. 24, when the non-magnetic plate shape block 31 and the magnetic material block 32 are bonded to each other by glass, the reinforcing glass 18c can be simultaneously provided therebetween. Further, such smooth shape may be cylindrical shape.

Figure 25:
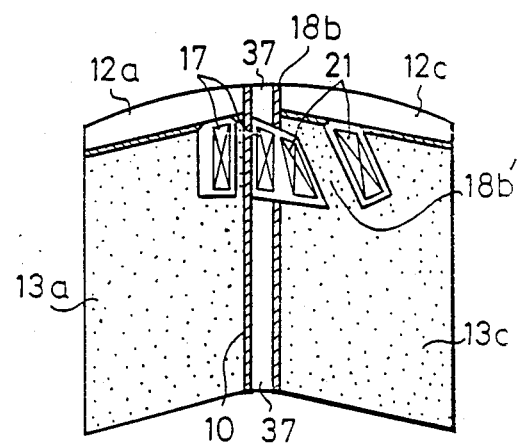

Preferably, the portion of the coil 21 of the tunnel erase main magnetic pole is inclined as shown in FIG. 25.

Figure 26:
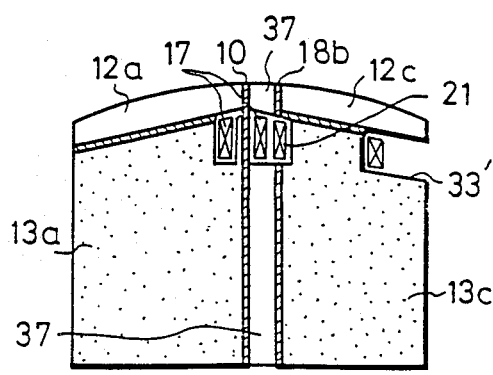

FIG. 26 shows other embodiment of this invention.

In this embodiment, the groove 33 for the winding of the tunnel erase main magnetic pole in the example shown in FIG. 16 is formed as a cut-out groove 33'. The other portions are formed similarly to those in the example shown in FIG. 16. This embodiment can achieve the same action and effect as those of the example in FIG. 16 and in addition, there is an advantage that the winding becomes easy.

Figure 27:
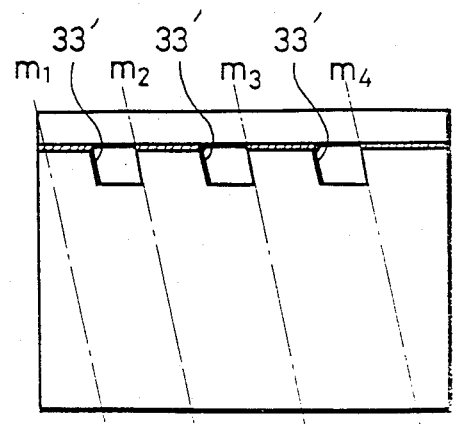
FIG. 27 is a diagram useful for the explanation of FIG. 26.

This manufacturing method therefor is nearly the same as that in the example shown in FIG. 16 but is different in that as shown in FIG. 27, the cut-out groove 33' is formed wider and the cut-out surfaces m1, m2 . . . are positioned as shown in the figure.

Furthermore, it may be possible that the coil on the erase side is formed as a thin film coil on the interface between the magnetic core portion and the guard member of the contact surface and the erasing main magnetic pole is magnetically connected to the magnetic core portion at the center of the thin film coil.

It is needless to say that the present invention is not limited to the above embodiments but can take various modifications without departing from the scope of the invention.

We claim:

1. A complex magnetic transducer head of single magnetic pole type for perpendicular mode recording, characterized by a perpendicular mode recording and reproducing magnetic transducer head portion which includes a recording and reproducing main magnetic pole made of a thin film of soft magnetic material, juxtaposed at its one end with a magnetic recording medium and having a predetermined width, non-magnetic material guard members for sandwiching said recording and reproducing main magnetic record medium, a magnetic core portion integrated with said non-magnetic material guard members, in contact with at least one surface of said recording and reproducing main magnetic pole and spaced away from said magnetic recording medium by a predetermined distance, a groove portion formed in said magnetic core portion opening toward said magnetic recording medium for separating a first auxiliary magnetic pole portion contacting with said recording and reproducing main magnetic pole from a return path portion serving as a return path for magnetic flux of said recording and reproducing main magnetic pole;

a winding wound on said recording and reproducing main magnetic pole through said groove portion;

a pair of erasing main magnetic poles facing said magnetic recording medium, spaced from said recording and reproducing main magnetic pole by a predetermined distance along its running direction relative to said record medium, said pair of erasing poles being spaced apart, transverse to said running direction by a distance smaller than said width of said recording and reproducing main magnetic pole; and means for exciting said erasing main magnetic poles, wherein said recording and reproducing main magnetic pole and said erasing main magnetic poles are integrated on a surface in contact with said record medium through said non-magnetic guard member.

2. A complex magnetic transducer head of single magnetic pole type for perpendicular mode recording, characterized by
   a perpendicular mode recording and reproducing magnetic transducer head portion which includes a recording and reproducing main magnetic pole made of a thick film of soft magnetic material, juxtaposed at its one end with a magnetic recording medium and having a predetermined width,
   non-magnetic material guard members for sandwiching said recording and reproducing main magnetic pole at both of its sides in contact with a surface of said magnetic recording medium,
   a magnetic core portion integrated with said non-magnetic guard members in contact with at least one surface of said recording and reproducing main magnetic pole and extending away from said magnetic recording medium by a predetermined distance,
   a groove portion formed in said magnetic core portion for separating a first auxiliary magnetic pole portion in contact with said recording and reproducing main magnetic pole from a return path portion serving as a return path for magnetic flux of said recording and reproducing main magnetic pole,
   a winding wound on said recording and reproducing magnetic pole through said groove portion, and
   an erasing head portion which consists of a pair of erasing main magnetic poles made of a pair of thin films of soft magnetic material, both being juxtaposed at their one end with said magnetic recording medium and spaced from said recording and reproducing main magnetic pole by a predetermined distance along the running direction of said magnetic recording medium, said erasing poles being spaced apart, transverse to said running direction along a distance smaller than the width of said recording and reproducing main magnetic pole,
   a second auxiliary magnetic pole in contact with said erasing main magnetic pole and disposed at a position remote from said magnetic recording medium for establishing a return path for magnetic flux generated from said magnetic core, and
   an erasing coil exciting said erasing main magnetic poles wherein said recording and reproducing main magnetic pole and said erasing main magnetic poles are integrated together in contact with said magnetic recording medium through said non-magnetic material guard block member.

3. A complex magnetic transducer head of single magnetic pole type for perpendicular mode recording according to either of claims 1 or 2, including a bonding surface between said magnetic core portion and one of said non-magnetic guard members, said bonding surface being generally parallel to and spaced from said magnetic recording medium and extending away from said recording and reproducing main magnetic pole.

4. A complex magnetic transducer head of single magnetic pole type for perpendicular mode recording according to either of claims 1 or 2, including a bonding surface between said magnetic core portion and one of said non-magnetic guard members, said bonding surface being generally parallel to and spaced from said magnetic recording medium and extending away from said erasing main magnetic pole.

5. A complex magnetic transducer head of single magnetic pole type for perpendicular mode recording, characterized by
   a recording and reproducing main magnetic pole made of a thin film of soft magnetic material, juxtaposed at its one end with a magnetic recording medium and having a predetermined width;
   a first auxiliary magnetic pole portion made of magnetic material and disposed remote from said one end of said recording and reproducing main magnetic pole at the upstream side of said magnetic recording medium and in contact with said recording and reproducing main magnetic pole;
   a pair of erasing main magnetic poles made of films of soft magnetic material, integrated with said recording and reproducing main magnetic pole in contact with said magnetic recording medium through a non-magnetic material guard member, spaced apart from said recording and reproducing main magnetic pole by a predetermined distance in the running direction of said magnetic record medium with a spacing along a direction transverse to said running direction smaller than the width of said main magnetic pole and juxtaposed at their one ends to said magnetic recording medium;
   a second auxiliary magnetic pole portion magnetically contacting said erasing main magnetic poles at a position remote from said magnetic recording medium and having a curved portion forming a magnetic path which is curved from said erasing main magnetic poles to the downstream side of said recording medium; and
   winding means for exciting said recording and reproducing main magnetic pole, and erase winding means wound about said curved portion of said second auxiliary magnetic pole portion for exciting said erasing main magnetic poles.

* * * * *